March 12, 1946.  H. C. ROSE  2,396,534
BATTERY PACK
Filed Sept. 2, 1943  3 Sheets-Sheet 1
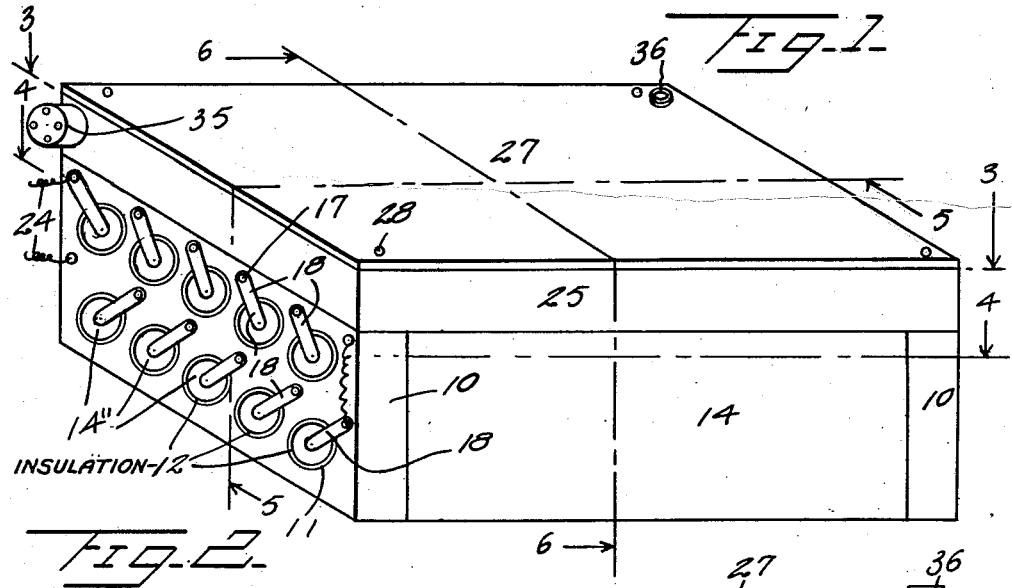
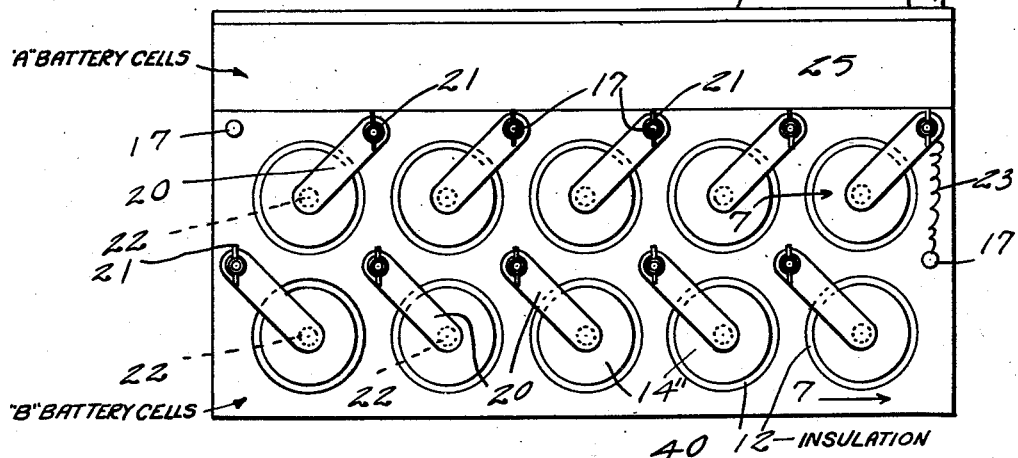
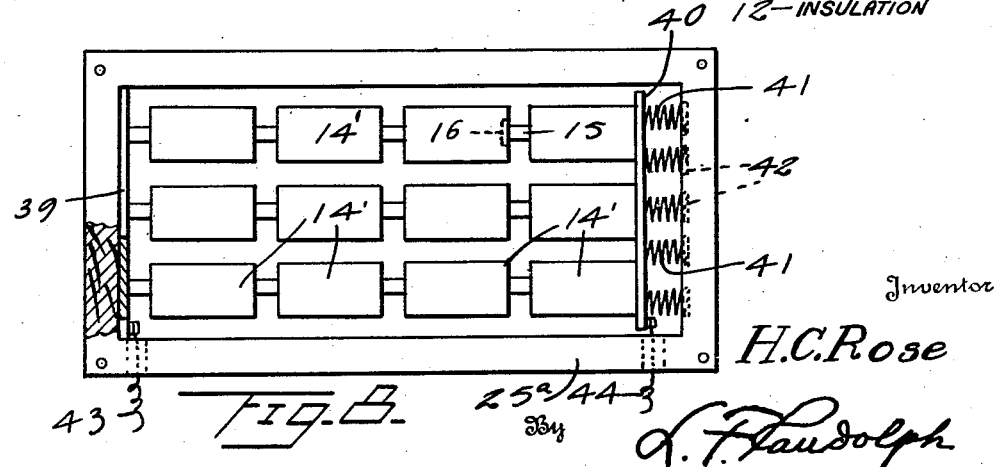
Inventor
H. C. Rose March 12, 1946. H. C. ROSE 2,396,534
BATTERY PACK
Filed Sept. 2, 1943 3 Sheets-Sheet 2
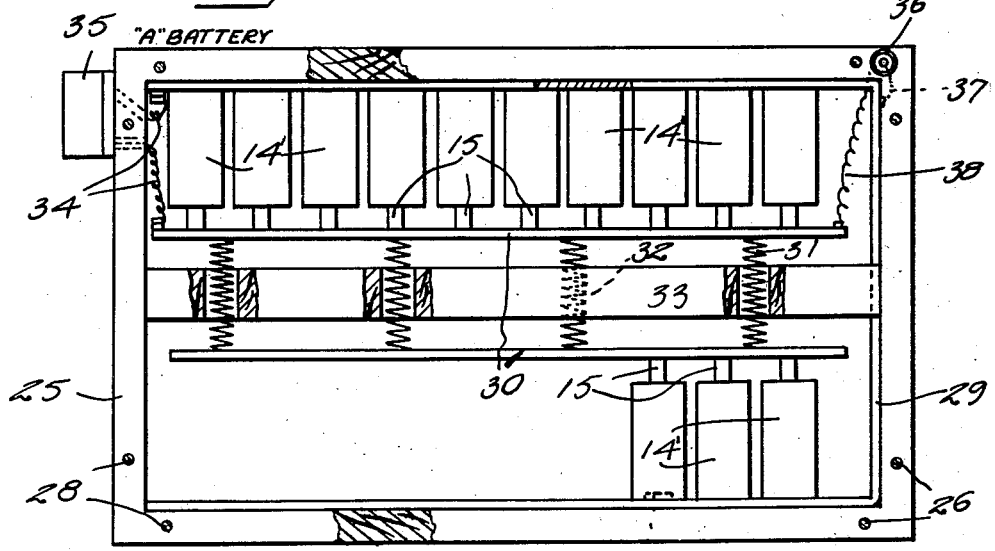
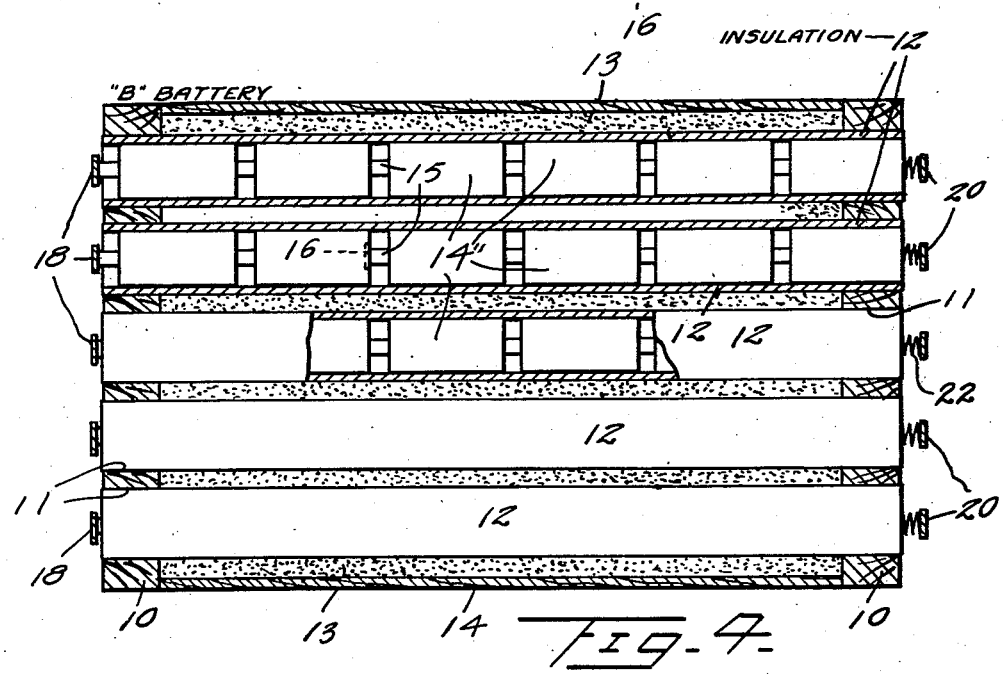
Inventor
H. C. Rose
By L. F. Randolph
Attorney March 12, 1946.　　　H. C. ROSE　　　2,396,534
BATTERY PACK
Filed Sept. 2, 1943　　　3 Sheets-Sheet 3
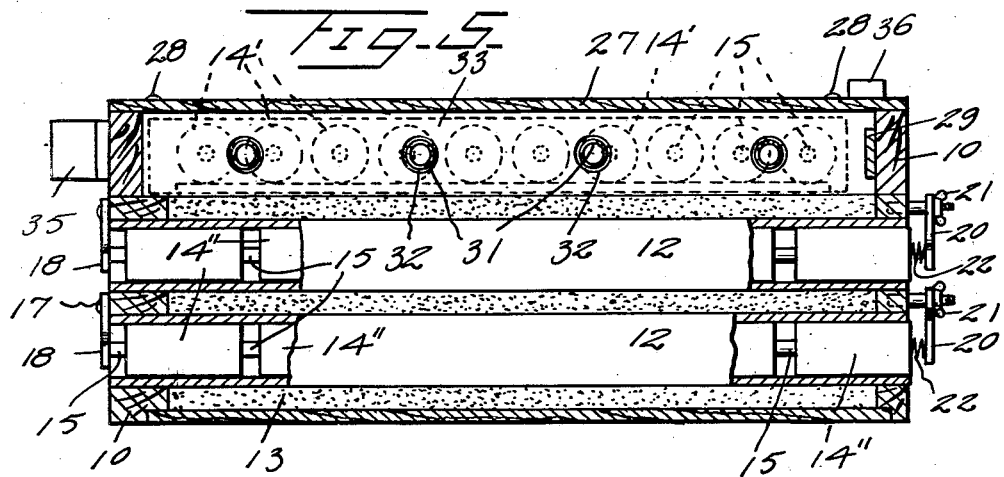
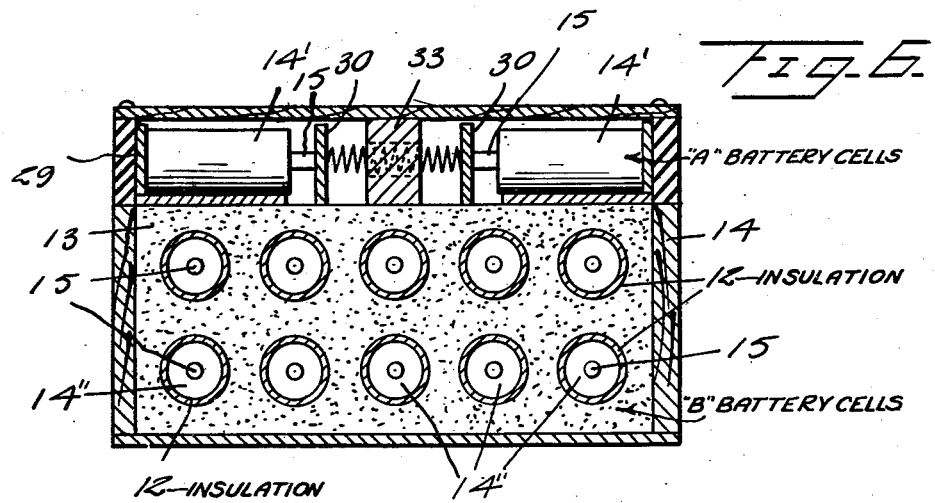
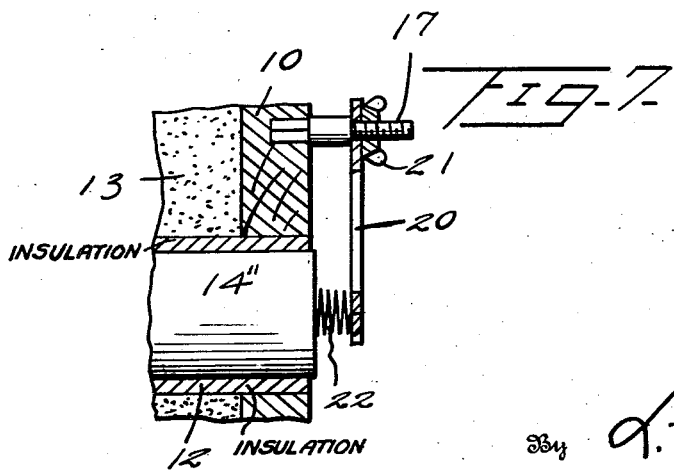
Inventor
H. C. Rose
By L. F. Randolph
Attorney Patented Mar. 12, 1946

2,396,534

UNITED STATES PATENT OFFICE 2,396,534

BATTERY PACK

Harm C. Rose, Franklin, Nebr.

Application September 2, 1943, Serial No. 500,978

2 Claims. (Cl. 136—173)

This invention relates to a battery, particularly of a type wherein a multiplicity of cells are employed.

It is particularly aimed to provide a novel construction and means whereby the cells may be removed individually and replaced in the event that one becomes spent, broken, or fails for any reason, thus avoiding the necessity of discarding the entire battery.

I also aim to provide a novel combination which will enable manufacture in a unit constituting both A and B batteries as is necessary in operating certain types of radios.

In addition it is aimed to provide a novel structure wherein any of the cells may be tested readily.

The more specific objects and advantages will become apparent from a consideration of the description following taken in connection with accompanying drawings illustrating an operative embodiment.

In said drawings:

Figure 1 is a view in perspective of the battery pack or unit constructed in accordance with the invention;

Figure 2 is an end elevation looking from the right of Figure 1;

Figure 3 is a plan view with the cover removed to disclose details.

Figure 4 is a horizontal sectional view taken approximately on the line 4—4 of Figure 1;

Figure 5 is a longitudinal sectional view on the line 5—5 of Figure 1;

Figure 6 is a transverse sectional view on line 6—6 of Figure 1;

Figure 7 is a detail sectional view on the line 7—7 of Figure 2; and

Figure 8 is a view similar to Figure 3 but taken of a modified form.

Referring specifically to the drawings and first to the form of Figures 1 to 4, I use two battens 10 of wood or any other suitable material, which are spaced apart and which have a suitable number of round openings at 11 in which the opposed end portions of tubes or cylinders 12 are disposed, such tubes or cylinders being of pasteboard, insulating material, or otherwise as preferred. The ends of the tubes may be cemented or positively fastened as by nails or the like, suitably insulated, to the wood 10 if desired. However, the tubes on the exterior, between the battens 10, may be exposed and spaced apart, or I may pour a suitable insulating compound 13 into the same to fill all spaces exteriorly of the tubes; and at the sides I may provide finishing panels of wood, paper, or any equivalent as at 14.

The tubes 12 removably accommodate any desired number of B battery cells 14'', for instance of the primary type and of conventional form, the same having the usual projecting central electrode at 15 and the non-projecting electrode at 16, the adjacent electrodes being adapted to contact removably.

The battens 10 are for the most part held in place by a plurality of longitudinally extending bolts 17, extending through them and projecting beyond the same, the bolts being parallel to the tubes 12.

Contact bars 18 are fastened on the adjacent ends of bolts 17 by nuts 19, and they are engaged or contacted by the adjacent central contacts 15. It will be realized that when the contact bars 18 are in place the cells 14'' of the associated tubes cannot be pushed out of place toward the left.

Such cells also cannot be pushed out of place toward the right due to the presence of contact bars 20 through which the other ends of the bolts 17 pass and which are externally engaged by nuts 21, which nuts, as well as those at 19, preferably are wing nuts in order to facilitate manipulation.

The contact bars 20 have springs 22 permanently attached to them, which also are conductors and which directly engage the adjacent cells 14'' at their unexposed contacts 16. Thus the cells 14'' may be removed readily, or replaced, upon removing the requisite nut 19 and/or 21, and relative sliding movement of the cells in the respective tubes is prevented due to the expansive action of the springs 22 as they are compressed through tightening of the nuts 21.

The parts described constitute a B battery for example, although no limitation is to be implied, and it is clear that the cells are electrically connected together by conductors 23 to attain any desired arrangement in series, parallel, or variations thereof, according to the voltage desired and the requirements, supply lines or leads 24 extending from one of the bars 20 to one of the bolts 17.

It will be noted that in certain instances the nuts 21 also function in connection with the bolt or rod 17 to act as binding posts, as well as having the function of securing the battens together and bars 18 and 20 in place.

Suitably mounted on the battens 10 is a relatively flat container 25 marginally coextensive with the B battery described and which is adapted to contain parts constituting an A battery, thus the invention providing a unit of A and B batteries as required for use in certain types of radios, for example. Fastenings 26 secure the container 25 below a closure 27 thereof and to the battens 10, while such closure 27 is secured to the remainder of the container 25 by fastenings at 28.

Within the container 25 is a U-shaped conductor 29 which fits against two sides and one end of such container. A suitable number of the A battery cells 14' are arranged in the container 25 with their contacts 16 in engagement therewith, while their opposite contacts are in engagement with conductor bars 30 having expansive conductor springs 31 between them to maintain intimate contact with the contacts 15 and to maintain the cells in place. The springs 31 are positioned by passage through transverse openings 32 in a partition 33 located longitudinally and centrally within the container 25. Electric current according to any desired arrangement or voltage is obtained by means of conductors or leads 34 extending exteriorly of the container 25 from one of the conductors 30 and the conductor 29. Such conductors 34 may extend any desired distance or they may be connected to a plug as at 35, supported on the container 25, to enable the appropriate feeds or connections of a radio to be directly plugged therein.

The fastenings 28 preferably are screws to enable removal of the closure or cover 27 and removal and replacement of any of the batteries within the container 25. Such batteries may be tested from a suitable conventional socket disclosed at one corner of the receptacle as at 36, with leads extending thereto at 37 and 38, from the conductor 29 and a conductor 30 respectively.

In lieu of the A battery arrangement best shown in Figure 3 I may employ that disclosed in Figure 8. In the latter figure a container 25a replaces that at 25, and interiorly has a multiplicity of the cells 14'. Within container 25a at one end is a conductor bar 39 with which the adjacent electrodes 15 directly contact, while at the opposite end of container 25a there is a floating conductor bar 40 engaged with the adjacent contacts 16, and so urged by a multiplicity of coil springs 41 attached thereto and seated in wells or depressions 42 of the adjacent end wall of container 25a. The electric current is lead from the conductors 39 and 40 by conductors 43 and 44 respectively, to the exterior through openings in the container 25a as shown. The container 25a and its removable closure which will be like that at 27 may have or mount a cell test socket like that at 36.

Various changes may be resorted to provided that they fall within the spirit and scope of the invention.

I claim as my invention:

1. A battery pack comprising a container, a partition therein, a pair of conductor bars on opposite sides of the partition, expansive coil springs extending through the partition and engaging said bars, cells having electrodes of opposite polarity at opposite ends, the electrodes of one polarity engaging said bars, and a generally U-shaped conductor bar engaged by said cells at the other electrode.

2. A battery pack comprising a container, a partition therein, a pair of conductor bars on opposite sides of the partition, expansive coil springs extending through the partition and engaging said bars, cells having electrodes of opposite polarity at opposite ends, the electrodes of one polarity engaging said bars, and a generally U-shaped conductor bar engaged by said cells at the other electrode, and a cell test socket on said container.

HARM C. ROSE.